C. W. SLEEPER.
DEVICE FOR TESTING CANS.
APPLICATION FILED APR. 25, 1908.
901,393.
Patented Oct. 20, 1908.
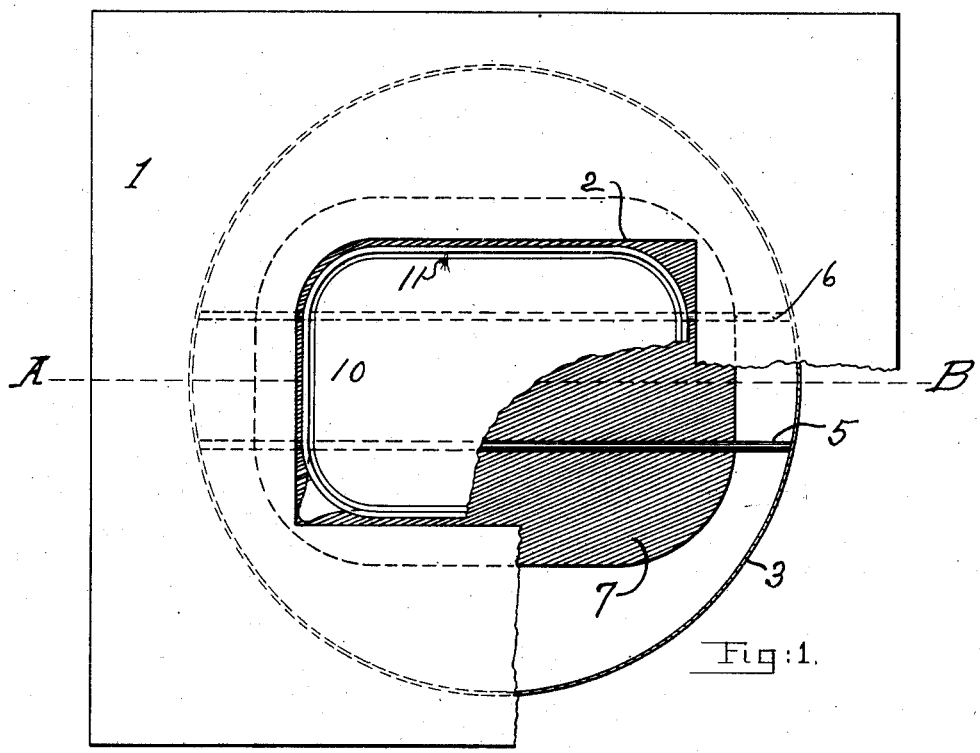
Fig:1.
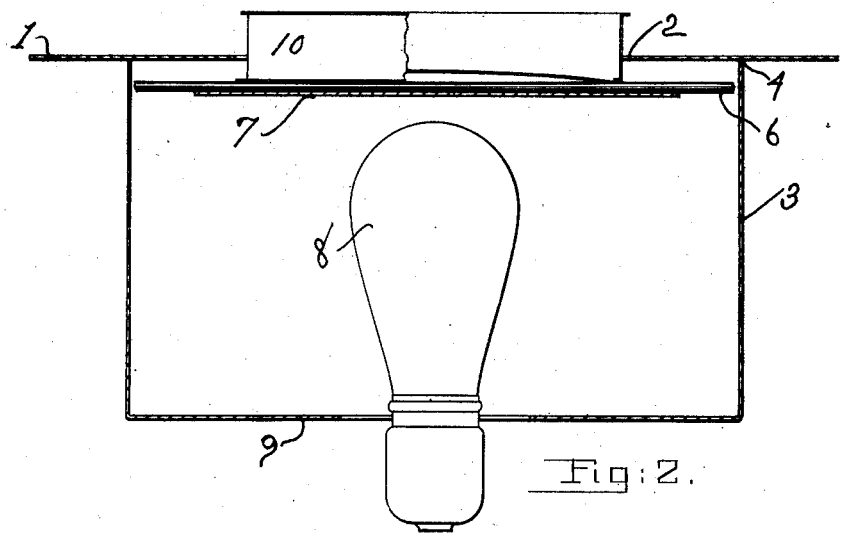
Fig:2.
Witnesses.
R. N. Flint
Chas. E. Bruce
Inventor.
Charles W. Sleeper
by W. Truly attorney

UNITED STATES PATENT OFFICE.

CHARLES W. SLEEPER, OF LANCASTER, NEW HAMPSHIRE.

DEVICE FOR TESTING CANS.

No. 901,393.

Specification of Letters Patent.

Patented Oct. 20, 1908.

Application filed April 25, 1908. Serial No. 429,273.

*To all whom it may concern:*

Be it known that I, CHARLES W. SLEEPER, a subject of the King of Great Britain and Ireland, residing at Lancaster, in the county of Coos, State of New Hampshire, have invented certain new and useful Improvements in Devices for Testing Cans, of which the following is a description, reference being had to the accompanying drawings, forming a part hereof.

My invention relates to a device designed to be used by inspectors whose duty it is to inspect the work done by a can soldering machine in order to detect and reject or remedy cans the seams of which have been imperfectly soldered; and the object thereof is to provide a device whereby defects in the seams formed in the soldering process will be clearly indicated to the inspector, so that he may reject the defective can or remedy the defect as by soldering the portion of the seam imperfectly soldered by the soldering machine.

My device indicates a defect in the seam by means of a ray of light passing through the portion of the seam which has not been properly soldered, that is through an opening in the seam resulting from a failure of the solder when melted to flow into and completely close the seam; and a further object of my invention is to provide a device for the purpose stated wherein light will be reflected to and concentrated upon the seam of the can to be inspected.

My device is especially adapted for use in inspecting that type of can wherein the body portion is provided with a flange extending at right angles and the head portion is placed upon said flange and soldered thereto without seaming the two parts together as by bending the parts one about the other where the seam is to be formed, to the end that the whole cover may be readily torn or ripped from the can as by a suitable key when the can is to be opened.

Cans of the type above mentioned have usually been tested automatically by testing machines designed primarily for use with cans in which the body and head portions have been more or less securely seamed together before the seam was soldered, which machines universally subject the can to pressure in order to secure it in the machine preparatory to the actual testing of the can, irrespective of the manner in which the can is tested after it has been secured in the machine. I have found that this preliminary step of applying pressure to the can will, with the type of can for which my device is designed, press the seam together and thereby close any openings which may be present therein; so that such machines will frequently fail to reject cans the seams of which are not properly soldered, the openings in the seam being merely closed and the parts held together by the pressure of the parts whereby the can is held in the testing machine. In my device, I avoid this step of subjecting the can to pressure prior to determining whether or not imperfections are present in the seam, so that any portion of the seam which has not been properly soldered will not be mechanically closed by the application of pressure to the can.

In the accompanying drawing in which I have illustrated an embodiment of my device: Figure 1 is a plan view partially broken to better illustrate certain of the parts, and, Fig. 2 is a sectional view taken upon the line A—B of Fig. 1.

1 is a plate which I designate as the top plate of my device, and 2 is an opening formed in the said plate 1 and of a size and form adapted to permit the insertion thereinto of a can to be inspected. This opening will be somewhat larger than the can, so that the can may be readily placed in the opening.

3 is a casing shown as cylindrical in form and secured to the top plate 1 at 4 in any suitable manner, as by being soldered thereto.

5 and 6 are rods extending across the casing 3 and having their ends supported in openings therein, and 7 is a plate supported by the rods 5, 6 and conveniently secured to the under sides thereof as shown. This plate, because of the function which it performs, may be appropriately termed a screen; and it is located at a short distance below the opening 2 and is somewhat larger than said opening, so that the periphery thereof extends beyond said opening as will be understood from the drawing.

8 is a source of light located within the casing 3, which source of light may conveniently be as indicated in the drawing an ordinary incandescent light.

9 is a plate forming the head of the casing 3 and preferably extending inward to a point as close as practicable to the source of light 8 to thereby inclose the same as completely as practicable.

The inner surface of the casing 3 should be highly polished or otherwise treated to form an effective reflecting surface for light, and the upper surface of the plate or screen 7 should be blackened as by painting or otherwise in order to make it as poor a reflector of light as possible.

10 represents a can to be inspected.

Such being the construction of my device, a can 10 is placed within the opening 2 and permitted to rest upon the rods 5, 6. The plate or screen 7 will intercept the direct rays from the source of light 8, but light from 8 will be reflected by the interior of the casing 3 and will be directed upon the seam at the bottom of the can. If then there is a hole or opening in the seam resulting from a failure of the solder when melted to flow properly and close the seam, light will pass through said opening and appear as a beam of light within the can, as indicated at 11. The beam of light within the can thus indicates an imperfection in the seam between the body and head or cover, and, if such imperfection is slight, it will commonly be soldered by the inspector. It is obvious, however, that imperfect cans may simply be discarded as found.

It will be seen that in my device as thus explained an exceedingly intense light is directed upon the seam of the can to be inspected; and I have found in practice that seams imperfectly soldered but in which the holes are closed by the flux used will be detected, the light being sufficiently intense to pass through such fluxes as are ordinarily used and indicate the imperfection by a beam of light within the can.

Having thus described my invention and explained the mode of operation thereof, I claim and desire to secure by Letters Patent:—

1. In a device of the class described, a plate having an opening adapted to receive a can to be inspected; means for supporting a can within said opening and in such a position that the seam thereof to be inspected will be beneath said plate; and a source of light beneath said plate.

2. In a device of the class described, a plate having an opening adapted to receive a can to be inspected; a screen impervious to light beneath said opening; and a source of light beneath said screen.

3. In a device of the class described, a plate having an opening adapted to receive a can to be inspected; means located beneath said plate for supporting a can within said opening; and in such a position that the seam thereof to be inspected will be beneath said plate and a source of light beneath said plate.

4. In a device of the class described, a plate having an opening adapted to receive a can to be inspected; means located beneath said plate for supporting a can within said opening; a screen beneath the opening in said plate; and a source of light beneath said screen.

5. In a device of the class described, a casing; a top plate therefor having an opening adapted to receive a can to be inspected; means for supporting a can within said opening; and in such a position that the seam thereof to be inspected will be beneath said plate and a lamp within said casing and beneath said can.

6. In a device of the class described, a casing; a top plate therefor having an opening adapted to receive a can to be inspected; means for supporting a can within said opening; a lamp within said casing and beneath said can; and a screen interposed between said can and said lamp.

7. In a device of the class described, a casing; a top plate therefor having an opening adapted to receive a can to be inspected; a support for a can located within said casing and below said top plate; and a lamp within said casing and beneath said support.

8. In a device of the class described; a casing; a top plate therefor having an opening adapted to receive a can to be inspected; a support for a can located within said casing and below said top plate; a lamp within said casing and beneath said support and a screen located between said support and said lamp.

9. In a device of the class described, a casing; a top plate therefor having an opening adapted to receive a can to be inspected; rods supported at their ends by said casing and extending across said casing beneath said top plate; a screen supported by said rods; and a lamp within said casing and beneath said screen.

This specification signed and witnessed this third day of April A. D. 1908.

CHARLES W. SLEEPER.

In the presence of—
GEO. N. KENT,
BERNICE A. LYMAN.